United States Patent
Yamada et al.

(10) Patent No.: US 7,094,047 B2
(45) Date of Patent: Aug. 22, 2006

(54) DIE FOR EXTRUSION MOLDING OF HONEYCOMB

(75) Inventors: Kenji Yamada, Nagoya (JP); Takashi Matsukubo, Nagoya (JP); Keiji Matsumoto, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 102 days.

(21) Appl. No.: 10/451,600

(22) PCT Filed: Oct. 7, 2002

(86) PCT No.: PCT/JP02/10400

§ 371 (c)(1),
(2), (4) Date: Jun. 24, 2003

(87) PCT Pub. No.: WO03/039826

PCT Pub. Date: May 15, 2003

(65) Prior Publication Data

US 2004/0052890 A1    Mar. 18, 2004

(30) Foreign Application Priority Data

Nov. 5, 2001    (JP) .............................. 2001-338823

(51) Int. Cl.
B29C 47/12    (2006.01)

(52) U.S. Cl. ................... 425/380; 249/134; 249/114.1; 425/461; 425/467

(58) Field of Classification Search ................ 425/380, 425/461, 467; 264/177.12; 427/135, 437, 427/438; 249/134, 114.1
See application file for complete search history.

(56) References Cited

U.S. PATENT DOCUMENTS

| 4,574,459 A | * | 3/1986 | Peters ........................ 29/527.4 |
| 4,861,626 A | * | 8/1989 | Ihara et al. .................. 427/133 |
| 5,070,588 A | * | 12/1991 | Miwa et al. ................ 76/107.1 |
| 6,193,497 B1 | | 2/2001 | Suzuki ........................ 425/380 |

FOREIGN PATENT DOCUMENTS

| EP | 0 276 083 A2 | 7/1988 |
| EP | 0 389 253 A2 | 9/1990 |
| JP | 2001-172766 A | 6/2001 |

* cited by examiner

Primary Examiner—Joseph S. Del Sole
(74) Attorney, Agent, or Firm—Oliff & Berridge PLC

(57) ABSTRACT

A die for extrusion molding of a honeycomb which comprises a structure provided with a groovy slit (2) formed by cell blocks (3) on a front face thereof, and additionally provided with a puddle inlet, on a back face thereof, communicatively connected with the slit (2), wherein each cell block (3) has a soft film (16) on a hard film (14) formed on outermost surfaces of the slit (2) and puddle inlet fabricated in a cell-block body (10). According to the die for extrusion molding of a honeycomb, a dimensional error of the die is possible to be eliminated, a stable force of extrusion friction is possible to be maintained, both extrusion moldability and abrasion resistance are possible to be excellent, and additionally an adjustment of the die at the time of extrusion molding can be performed easily.

22 Claims, 1 Drawing Sheet

DIE FOR EXTRUSION MOLDING OF HONEYCOMB

TECHNICAL FIELD

The present invention relates to a die for extrusion molding of a honeycomb.

BACKGROUND ART

Heretofore, as a die used in extrusion molding of honeycomb, there has been known the die for extrusion molding of honeycomb, provided with groovy slits on the front face thereof which are formed by cell blocks, and provided with puddle inlets on the back face thereof which are communicatively connected with the slits.

In such a die for extrusion molding of honeycomb, for the purpose of adjusting the slit widths between the respective cell blocks and enhancing the durability of the dies, for example, a surface treatment is performed along the line of forming a nickel plating layer (a first coating film) of 10 to 70 μm on the surface of a cell-block body, and then forming, on the surface of the nickel plating layer, either a composite plating layer in which hard powders of SiC, diamond, CBN, or the like is dispersed in the nickel plating layer or a tungsten carbide layer of 5 to 15 μm (a second coating film).

However, in the case where a tungsten carbide film is formed in the above described surface treatment, it is difficult to adjust the film thickness as compared with the plating, and accordingly there has been a problem that dimensional error is caused for the dies in which the target dimension±2 μm is required for the coating film (a first coating film+a second coating film).

The above described tungsten carbide film is easily liable to vary in a ratio of W and C, and a frictional resistance with puddle being extruded varies due to a variation of the ratio; accordingly, when a difference in a frictional resistance distribution in the formed film is large, the molding comes to be unstable, and the shapes of the molded bodies are hardly made stable, and hence the rate of good quality products has remained low.

Additionally, when the composite plating film is formed in the above described surface treatment, the hard grains are protruded on the composite plate film, and the coefficient of the friction with puddle being extruded varies depending on the hard grain density; thus, when the hard grain density distribution difference is large, there has occurred a fact that the molding comes to be unstable, and the shapes of the molded bodies are hardly made stable, and hence the rate of good quality products is lowered.

Furthermore, as for the above described die for extrusion molding of a honeycomb, puddle is made to flow partially, in order to adjust the dimensional dispersion of the die before the extrusion molding of a honeycomb.

However, in the case where a tungsten carbide film, a titanium based film, or a composite plating film is used for the second coating film, there has been a problem that the adjustment of the die is difficult and accordingly takes a long time because these films are hard.

The present invention is achieved in view of the above described problems heretofore, and takes as its object the provision of a die for extrusion molding of a honeycomb which is possible to eliminate the dimensional error of the die, maintain a stable frictional force of extrusion, be excellent both in extrusion moldability and in abrasion resistance, and additionally make the adjustment of the die easy at the time of extrusion molding.

DISCLOSURE OF THE INVENTION

According to the present invention, there is provided A die for extrusion molding of a honeycomb, comprising a structure provided with a groovy slit formed on a front face thereof by cell blocks and additionally with a puddle inlet, on a back face thereof, communicatively connected with the slit, characterized in that each cell block has a soft film on a hard film formed on outermost surfaces of both the slit and the puddle inlet fabricated in the cell block body.

In this connection, it is preferable that the above described soft film has a Vickers hardness of from 500 to 1500, and the thickness thereof is in a range of from 2 to 10 μm.

Furthermore, it is preferable that the above described soft film is an electroless nickel plating film.

In the next place, in the present invention, it is preferable that the hard film is a film comprising, as a component, one or more than one materials selected from a group consisting of W, WC, $W_2C$, and $W_3C$, or a CVD or a PVD film comprising, as a component, one or more than one materials selected from a group consisting of TiC, TiN, and TiCN.

Additionally, in the present invention, it is preferable that the hard film is a composite plating film having a hard powder of SiC, diamond, CBN, or the like dispersed in a nickel plating film.

BEST MODE FOR CARRYING OUT THE INVENTION

As described above, a die of the present invention is a die for extrusion molding of a honeycomb which comprises a structure provided with a groovy slit on the front face thereof formed by cell blocks, and simultaneously provided with a puddle inlet, on a back face thereof, communicatively connected with the slits, wherein each cell block has a soft film (for example, an electroless nickel plating film) on a hard film formed on the outermost surfaces of the slit and puddle inlet fabricated in the cell-block body.

Thereby, the die of the present invention is possible to eliminate the dimensional error of the die, maintain a stable frictional force of extrusion, be excellent both in extrusion moldability and in abrasion resistance, and additionally make the adjustment of the die easy at the time of extrusion molding.

Detailed description will be made below on embodiments of the present invention on the basis of the drawings.

Figure 1:
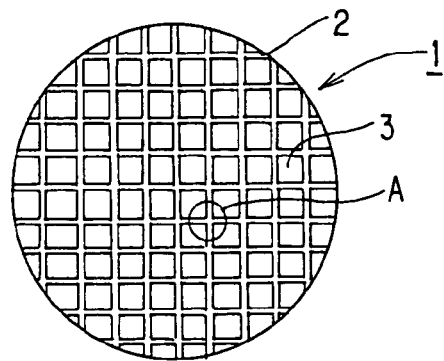
FIG. 1 is a schematic front view showing an example of a die for extrusion molding of a honeycomb.
Figure 2:
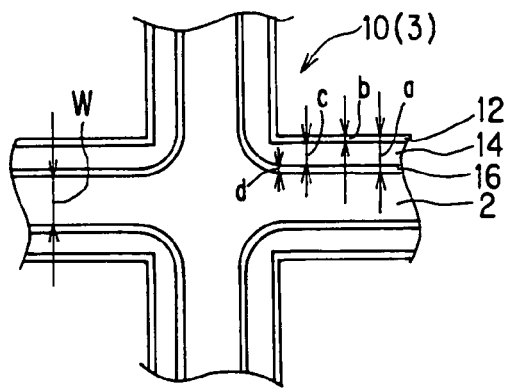
FIG. 2 is an enlarged front view of a portion A in FIG. 1.
Figure 3:
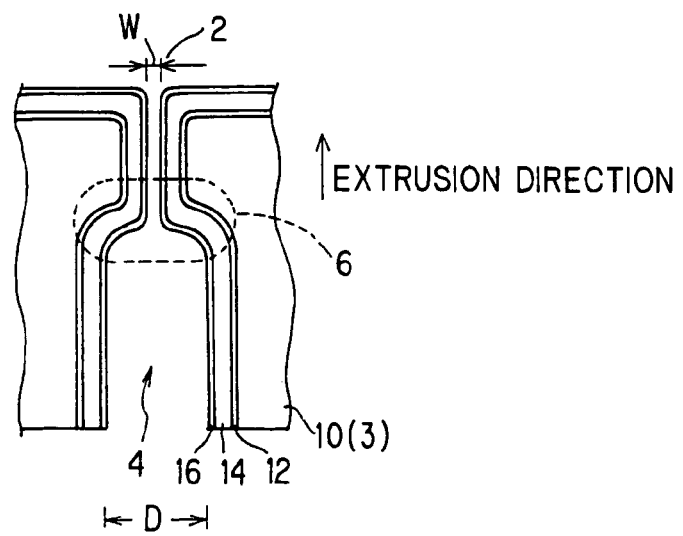
FIG. 3 is an enlarged sectional view of the portion A in FIG. 1.

FIGS. 1 to 3 show an example of a die for extrusion molding of a honeycomb; FIG. 1 is a schematic front view, FIG. 2 is an enlarged front view of a portion A in FIG. 1, and FIG. 3 is an enlarged sectional view of the portion A in FIG. 1.

For example, as shown in FIGS. 1 to 3, a die of the present invention is a die 1 for extrusion molding of a honeycomb which has a structure provided with a groovy slit 2 on a front face thereof, formed by cell blocks 3, and simultaneously provided with a puddle inlet 4, on a back face thereof, communicatively connected with the slit 2.

Each cell block 3 comprises a first coating film 12 formed on the surfaces of the slit 2 and a puddle inlet 4 provided in a cell block body 10, a second coating film 14, a hard film, which is formed on the surface of the first coating film 12 and protecting the first coating film 12, and a third coating film 16, a soft film, which is formed on the surface of the second coating film 14.

Here, the die of the present invention is mainly characterized in that the third coating film 16, a soft film, is formed on the surface of the second coating film 14, a hard film, protecting the first coating film 12.

Thereby, the die of the present invention is possible to eliminate the dimensional error, by forming the third coating film 16 of 10 μm or less, either even in the case where the film thickness accuracy of the second coating film 14 is low or even in the case where the die is required to have the dimensional accuracy of ±2 μm.

This is because a plating film is relatively easy in controlling the film formation and film thickness, as compared with a CVD film and a PVD film.

Additionally, the die of the present invention is excellent in extrusion moldability and in abrasion resistance, because it can maintain a stable frictional force of extrusion even in the case where the condition of the second coating film 14 tends to vary, owing to the formation of the third coating film 16 on the throttle portion 6 (see FIG. 3), a portion most liable to be worn in the die.

Incidentally, the above mentioned throttle portion 6 remains protected by the second coating film even in the case where the third coating film has been worn; additionally, the extrusion moldability is largely affected by the endmost outlet portion 2, but these portions are scarcely liable to be worn and accordingly the third coating film is scarcely worn, and hence the moldability can be maintained to be satisfactory.

Furthermore, the die of the present invention gives an easy short-time adjustment of a slit width W between each of the cell blocks 10, by forming the third coating film 16, a soft film, on the surface of the second coating film 14, a hard film.

In this connection, a thickness a of all the coating films (the first through third coating films) used in the present invention is not particularly limited, but it is preferably that it ranges from 20 to 120 μm in consideration of the machining difficulty level of the base metal.

In this connection, the first coating film used in the present invention is the substrate to adjust the slit width W between each of the cell blocks, and needs not necessarily to be formed, depending on the hard film formed on the outermost surface; however, in the case where the first coating film is formed, it is preferable that it is an electroless nickel plating film, to the extent of maintaining an appropriate hardness, being relatively easy in film forming, and also being relatively easy in controlling the film thickness.

Incidentally, it is usually preferable that a thickness b of the first coating film is in a range of from 0 to 100 μm.

Additionally, the second coating film used in the present invention is a hard film protecting the first coating film that is a base film; as the second coating film, any of the following films can be appropriately selected to be used: (1) a CVD film composed of one or more than one materials selected from the group consisting of W, WC, $W_2C$, and $W_3C$; (2) either a CVD film or a PVD film composed of one or more than one materials selected from the group consisting of TiC, TiN, and TiCN; (3) a composite plating film in which the hard powder of SiC, diamond, CBN, or the like is dispersed in a nickel plating film.

Incidentally, it is usually preferable that a thickness c of the second coating film is in a range of from 1 to 70 μm.

Furthermore, the third coating film used in the present invention is not particularly limited as far as it is formed of a material with the Vickers hardness thereof of the order of from 500 to 1500, for the purpose of making it efficient to correct the dimensional dispersion of the die before the extrusion molding of a honeycomb; however, it is preferable that the third coating film is an electroless nickel plating film.

Incidentally, it is preferable that a thickness d of the third coating film is in a range of from 2 to 10 μm, for the purpose of displaying the effect of the present invention.

Further detailed description will be made below on the present invention on the basis of the examples, but the present invention is not limited by these examples.

EXAMPLES, COMPARATIVE EXAMPLES

A piece of C-450 stainless steel plate material was machined into a square plate of 200 mm on a side and 20 mm in thickness, by using a grinding machine.

Additionally, slits of 150 μm in the width W and 3 mm in depth were formed by groove milling with a pitch of 0.9 mm, in a grid pattern, on one end face of the square plate by the machining of grinding (see FIGS. 2 and 3).

Furthermore, holes of 0.9 mm in diameter D and 15 mm in depth were fabricated at the crossover positions of the slits (at every other positions) with a pitch of 0.9 mm, from the other end face side of the square plate, by means of the ECM processing (see FIGS. 2 and 3).

The coating films shown in Table 1 were respectively applied onto the die obtained by the above described method (see FIGS. 2 and 3), and then extrusion molding of honeycomb structures composed of a cordierite composition was performed.

For this case, the results of the extrusion length required for adjusting the dimensional error in the die and the extrusion length at the time of extrusion molding of a honeycomb structure are shown in Table 1.

TABLE 1

|  | Example | Comparative example |
| --- | --- | --- |
| First coating film 12 | Ni—P (electroless plating) 28 μm | Ni—P (electroless plating) 30 μm |
| Second coating film 14 | $W_2C$ (CVD) 10 μm | $W_2C$ (CVD) 10 μm |
| Surface treatment | 35% HCl, thereafter electroplating >0.1 μm | — |
| Third coating film 16 | Ni—P (electroless plating) 2 μm | — |
| Length required for adjusting dimensional dispersion in a die (m) | 100 | 500 |
| Extrusion length at time of extrusion molding of a honeycomb structure (m) | 3900 | 3500 |

(Consideration)

From the results shown in Table 1, Example is able to adjust the dimensional dispersion of the die in a short time, as compared with Comparative Example, and simultaneously to improve the productivity of a honeycomb structure.

Additionally, it is confirmed that Example, as compared to Comparative Example, eliminated the dimensional error in the die, maintained a stable frictional force of extrusion, and was excellent both in extrusion moldability and in abrasion resistance.

INDUSTRIAL APPLICABILITY

The die of the present invention, for extrusion molding of a honeycomb, can be suitably used for extrusion molding of a ceramic honeycomb.

Particularly, the die of the present invention, for extrusion molding of a honeycomb, is possible to eliminate the dimensional error of the die, and simultaneously is possible to maintain a stable frictional force of extrusion, is possible to be excellent both in extrusion moldability and in abrasion resistance, and additionally gives an easy adjustment of the die at the time of extrusion molding.

The invention claimed is:

1. A die for extrusion molding of a honeycomb, comprising a structure provided with a grooved slit formed on a front face thereof by cell blocks and additionally with a puddle inlet, on a back face thereof, communicatively connected with the slit, wherein each cell block has a soft exterior film formed over a hard interior film, the hard interior film being formed on at least a portion of the cell block where the slit and the puddle inlet are formed, the soft film is an electroless nickel plating film and is softer than the hard film.

2. A die for extrusion molding of a honeycomb according to claim 1, wherein a Vickers hardness of the soft film is in a range of from 500 to 1500.

3. A die for extrusion molding of a honeycomb according to claim 1, wherein a thickness of the soft film is in a range of from 2 to 10 μm.

4. A die for extrusion molding of a honeycomb according to claim 2 wherein a thickness of the soft film is in a range of from 2 to 10 μm.

5. A die for extrusion molding of a honeycomb according to claim 1, wherein the hard film is a CVD film comprising, as a component, one or more materials selected from a group consisting of W, WC, $W_2C$, and $W_3C$.

6. A die for extrusion molding of a honeycomb according to claim 2, wherein the hard film is a CVD film comprising, as a component, one or more materials selected from a group consisting of W, WC, $W_2C$, and $W_3C$.

7. A die for extrusion molding of a honeycomb according to claim 3, wherein the hard film is a CVD film comprising, as a component, one or more materials selected from a group consisting of W, WC, $W_2C$, and $W_3C$.

8. A die for extrusion molding of a honeycomb according to claim 1, wherein the hard film is a CVD film or a PVD film comprising, as a component, one or more materials selected from a group consisting of TiC, TiN, and TiCN.

9. A die for extrusion molding of a honeycomb according to claim 2, wherein the hard film is a CVD film or a PVD film comprising, as a component, one or more materials selected from a group consisting of TiC, TiN, and TiCN.

10. A die for extrusion molding of a honeycomb according to claim 3, wherein the hard film is a CVD film or a PVD film comprising, as a component, one or more materials selected from a group consisting of TiC, TiN, and TiCN.

11. A die for extrusion molding of a honeycomb according to claim 1, wherein the hard film is a composite plating film having a hard powder of at least one of SiC, diamond, CBN, dispersed in a nickel plating film.

12. A die for extrusion molding of a honeycomb according to claim 2, wherein the hard film is a composite plating film having a hard powder of at least one of SiC, diamond, CBN, dispersed in a nickel plating film.

13. A die for extrusion molding of a honeycomb according to claim 3, wherein the hard film is a composite plating film having a hard powder of at least one of SiC, diamond, CBN, dispersed in a nickel plating film.

14. A die for extrusion molding of a honeycomb, comprising a structure provided with a grooved slit formed on a front face thereof by cell blocks and additionally with a puddle inlet, on a back face thereof, communicatively connected with the slit, wherein each cell block has a first film formed as an exterior to the cell block, a second film formed as an exterior over at least a portion of the first film where the slit and the puddle inlet are formed, a third film is an electroless nickel plating film and is formed as an exterior over the second interior film, and the second film is harder than the third film.

15. A die for extrusion molding of a honeycomb according to claim 14, wherein the second film is harder than the first film.

16. A die for extrusion molding of a honeycomb according to claim 14, wherein the first film is an electroless nickel plating film.

17. A die for extrusion molding of a honeycomb according to claim 14, wherein the second film is a CVD film made of W, WC, or $W_2C$.

18. A die for extrusion molding of a honeycomb according to claim 14, wherein the second film is a CVD or PVD film made of TiC, TiN, or TiCN.

19. A die for extrusion molding of a honeycomb according to claim 14, wherein the second film is a composite plating film containing a hard powder.

20. A die for extrusion molding of a honeycomb according to claim 19 wherein the hard powder is SiC, diamond, or CBN dispersed in a nickel substrate.

21. A die for extrusion molding of a honeycomb according to claim 14, wherein the third film has a Vickers hardness of 500 to 1500.

22. A die for extrusion molding of a honeycomb according to 14 wherein the first film has a Vickers hardness of 500 to 1500.

* * * * *